US011843730B2

(12) United States Patent
Kobayashi

(10) Patent No.: US 11,843,730 B2
(45) Date of Patent: Dec. 12, 2023

(54) INFORMATION PROCESSING METHOD THAT CONVERTS A TELEPHONE FUNCTION CODE INCLUDED IN DESTINATION INFORMATION TO A FAX TRANSMISSION FUNCTION CODE, AND STORAGE MEDIUM

(71) Applicant: Canon Kabushiki Kaisha, Tokyo (JP)

(72) Inventor: Hiroaki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/993,311

(22) Filed: Nov. 23, 2022

(65) Prior Publication Data

US 2023/0188653 A1     Jun. 15, 2023

(30) Foreign Application Priority Data

Dec. 13, 2021  (JP) ................... 2021-201992

(51) Int. Cl.
*H04N 1/00*     (2006.01)
(52) U.S. Cl.
CPC ..... *H04N 1/00214* (2013.01); *H04N 1/00228* (2013.01); *H04N 1/00405* (2013.01)

(58) Field of Classification Search
None
See application file for complete search history.

(56) References Cited

U.S. PATENT DOCUMENTS

2004/0218224 A1 * 11/2004 Cariffe ............... H04N 1/33323
                                                    358/407
2011/0235095 A1 *  9/2011 Kudo ................. H04N 1/32797
                                                    358/1.15

FOREIGN PATENT DOCUMENTS

| JP | 2021-052427   | * | 4/2021 | ............. H04M 1/00 |
| JP | 2021-052427 A |   | 4/2021 |                         |
| WO | WO-9206551 A1 | * | 4/1992 | ............ H04M 11/00 |

* cited by examiner

*Primary Examiner* — Miya J Cato
*Assistant Examiner* — Pawan Dhingra
(74) *Attorney, Agent, or Firm* — Venable LLP

(57) ABSTRACT

A non-transitory computer-readable storage medium stores a program that, when executed by a computer, causes the computer to perform an information processing method. Setting destination information which indicates a destination of fax transmission. Converting a first code into a second code indicating an instruction in a fax transmission function of an image forming apparatus when the destination information includes the first code. Transmitting the destination information to the image forming apparatus, the destination information including the second code.

14 Claims, 20 Drawing Sheets

F I G. 6D

| FAX | | | | | | | POWER SAVING | USER LOGOUT | |
|---|---|---|---|---|---|---|---|---|---|
| TRANSMITTABLE | | | | | | | SETTING/ REGISTRATION | HOME | |
| NUMBER OF DESTINATION: 1 | | FREQUENTLY USED SETTING | | | | | 1 | 2 | 3 |
| | | LOG OF SETTING | | | | | | | |
| OP | | 200x200dpi | | | | | 4 | 5 | 6 |
| | | AUTO SIZE | | | | | 7 | 8 | 9 |
| TONE | PAUSE | DENSITY | | | | | * | 0 | # |
| | 631 | DOUBLE-SIDED DOCUMENT | | | | | C | RESET | |
| | | DOCUMENT SIZE MIXED STACKING | | | | | START | STOP | |
| | | OTHER FUNCTIONS | | | | | | | |
| STATUS CONFIRMATION | | | | | | | | | |

630, 631, 632

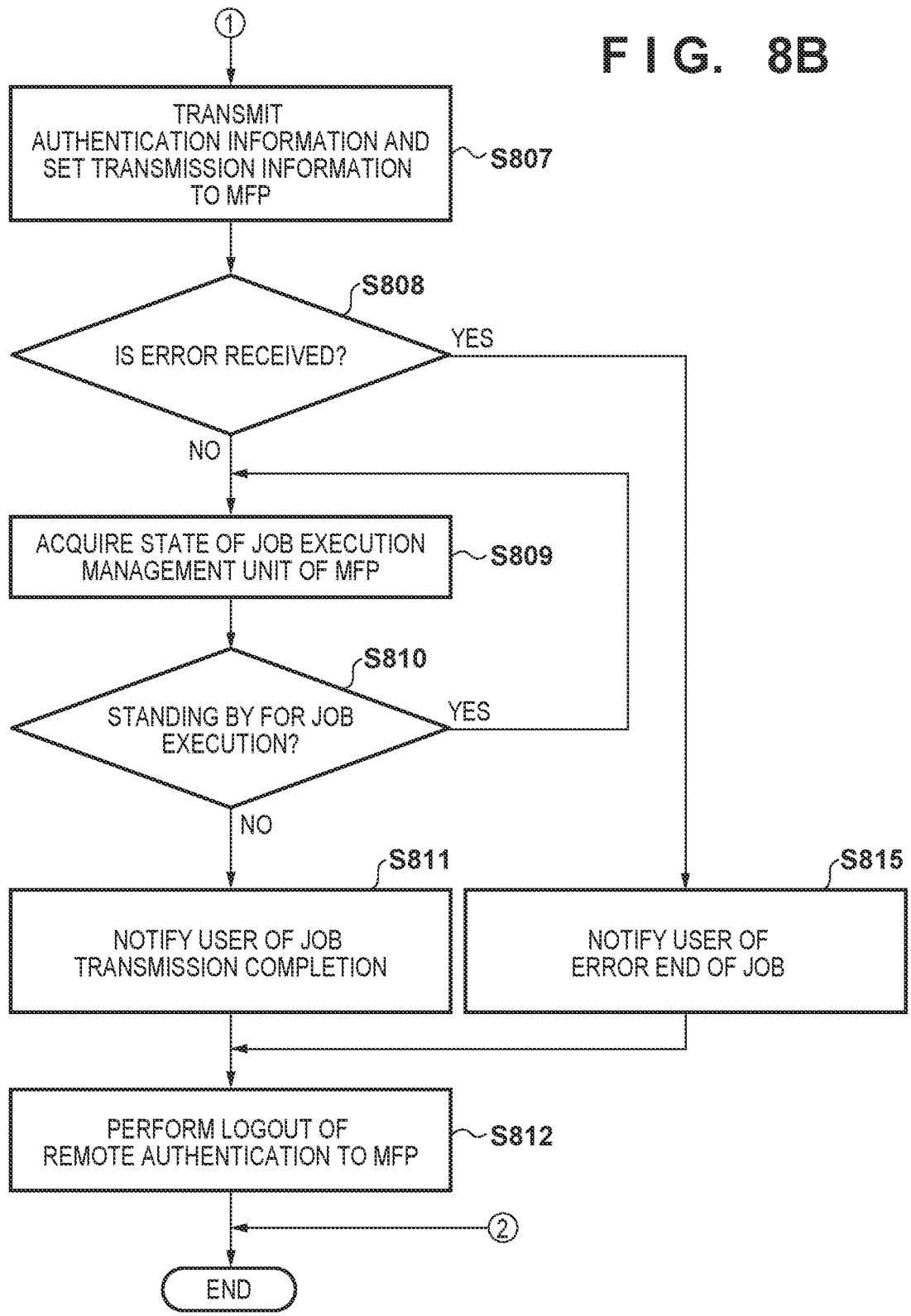

FIG. 11A

| CHARACTER STRING | INSTRUCTION |
|---|---|
| P | PAUSE |
| T | TONE |

FIG. 11B

| CHARACTER STRING | INSTRUCTION |
|---|---|
| P | PAUSE |
| , | PAUSE |
| T | TONE |

INFORMATION PROCESSING METHOD THAT CONVERTS A TELEPHONE FUNCTION CODE INCLUDED IN DESTINATION INFORMATION TO A FAX TRANSMISSION FUNCTION CODE, AND STORAGE MEDIUM

BACKGROUND OF THE INVENTION

Field of the Invention

The present invention relates to an information processing apparatus, an image forming apparatus, an information processing method, and a storage medium.

Description of the Related Art

In recent years, in conjunction with a spread of high-performance mobile terminals referred to as smartphones, the mobile terminal associates with an image forming apparatus by an application, and performs, for example, a scan function, a print function, or a job transmission function. For example, in the job transmission function, the mobile terminal searches for the image forming apparatus on a LAN and transmits a transmission job to which a destination set by a user and various kinds of scan setting information (for example, color and double-sided printing) are added. With such a configuration, in an image forming apparatus having a fax function, a series of processing necessary for fax can be performed by the mobile terminal.

Japanese Patent Laid-Open No. 2021-052427 discloses a technique in which a mobile terminal sets a destination of a fax and read transmission information related to reading of a document and transmits them to an image forming apparatus, and the image forming apparatus that performs fax transmission using the received destination and read transmission information.

SUMMARY OF THE INVENTION

According to one embodiment of the present disclosure, a non-transitory computer-readable storage medium storing a program that, when executed by a computer, causes the computer to perform an information processing method, the information processing method comprises: setting destination information which indicates a destination of fax transmission; converting a first code into a second code indicating an instruction in a fax transmission function of an image forming apparatus when the destination information includes the first code; and transmitting the destination information to the image forming apparatus, the destination information including the second code.

According to another embodiment of the present disclosure, an information processing method comprises: setting destination information which indicates a destination of fax transmission; converting a first code into a second code indicating an instruction in a fax transmission function of an image forming apparatus when the destination information includes the first code; and transmitting the destination information to the image forming apparatus, the destination information including the second code.

According to still another embodiment of the present disclosure, an image forming apparatus comprising: reception unit configured to receive destination information indicating a destination to which a fax is transmitted; determination unit configured to determine whether the destination information includes a first code indicating an instruction in a telephone function; interpretation unit configured to interpret the first code as a second code indicating the instruction in a fax transmission function of the image forming apparatus when the destination information is determined to include the first code; and transmission unit configured to perform fax transmission based on the destination information including the instruction.

Further features of the present invention will become apparent from the following description of exemplary embodiments (with reference to the attached drawings).

BRIEF DESCRIPTION OF THE DRAWINGS

FIG. 6A, FIG. 6B, FIG. 6C, and FIG. 6D are diagrams illustrating an example of a UI of the image forming apparatus according to the first embodiment.

FIG. 8A and FIG. 8B are flowcharts depicting an example of processing of a fax transmission instruction according to the first embodiment.

FIG. 11A is a diagram illustrating an example of a correspondence table of instructions of the fax transmission function according to the first embodiment.

FIG. 11B is a diagram illustrating an example of a correspondence table of instructions of a fax transmission function according to the second embodiment.

DESCRIPTION OF THE EMBODIMENTS

Figure 1:
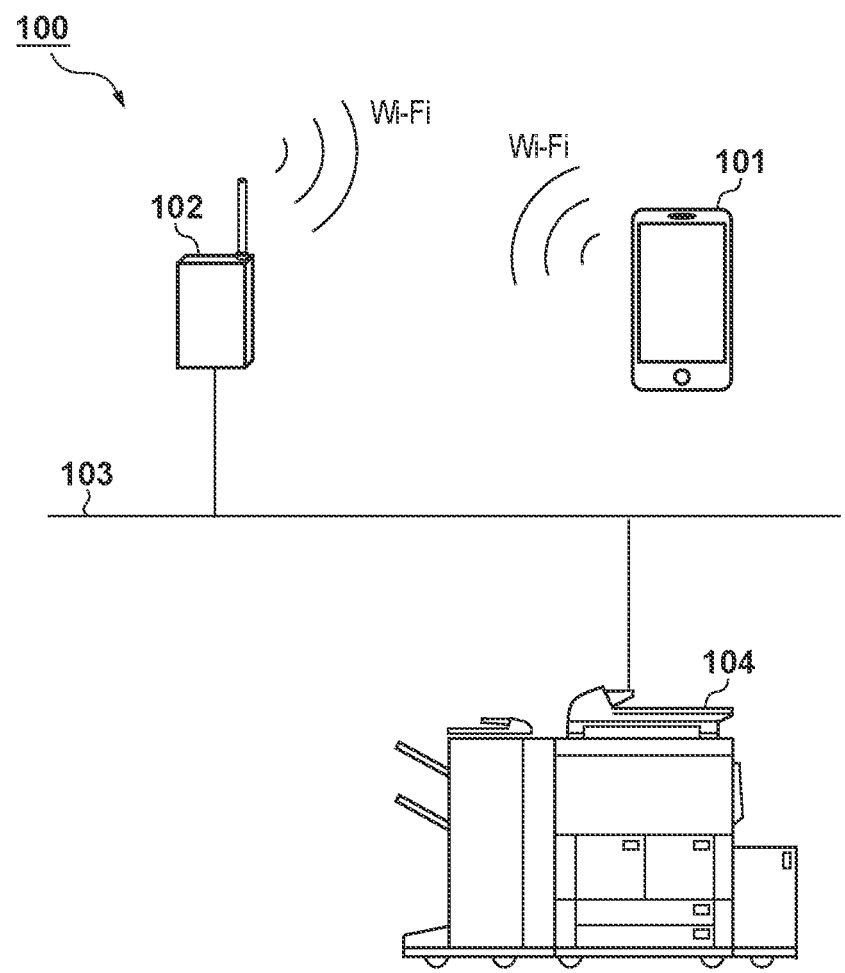
FIG. 1 is a diagram illustrating an example of a configuration of an information processing system according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

An instruction in a telephone function, such as a pause function, input as a destination in a mobile terminal has not been correctly interpreted in an image forming apparatus in some cases.

An object of the present invention is to correctly interpret destination information of a fax input via the telephone function in the image forming apparatus.

FIG. 1 is a diagram illustrating an example of a configuration of an information processing system including an information processing apparatus 101 according to the present embodiment. In a system 100, each of the information processing apparatus 101, a terminal 102, and an image forming apparatus 104 is connected via a network 103.

The information processing apparatus 101 is an apparatus that allows transmitting the destination information indicative of a destination to which a fax is transmitted to the image forming apparatus 104. The information processing apparatus 101 may operate a program for controlling, for example, an operating system (OS) for small size terminal, a call, or data communications. In the present embodiment, a user performs an input on the information processing apparatus 101 to instruct a job execution to the image forming apparatus 104, thus ensuring performing various functions that the image forming apparatus 104 has. In the present embodiment, the information processing apparatus 101 will be described as being a mobile terminal, such as a smartphone having a telephone function, but may be a device different from the image forming apparatus 104, such as a personal computer (PC).

The terminal 102 provides a wireless LAN through Wi-Fi. For example, the terminal 102 according to the present embodiment can be mounted as, for example, a general master device of a wireless LAN having a network/router function and performs communications by wireless LAN, for example, in home or in an office. Note that the function provided by the terminal 102 is not especially limited to a wireless LAN as long as the terminal 102 provides a communication function to the information processing apparatus 101 and the image forming apparatus 104, and, for example, the terminal 102 may be connected to the image forming apparatus by wire.

The image forming apparatus 104 is, for example, a digital multifunction machine, and includes a fax transmission function. In addition to the fax transmission function, the image forming apparatus 104 may include, for example, a printer function, a copy function, or a scanner function.

In addition, the information processing apparatus 101 and the image forming apparatus 104 may perform near field wireless communication via wireless communication, such as Near Field Communication (NFC) or Bluetooth Low Energy (BLE (registered trademark)). The image forming apparatus 104 according to the present embodiment has connection information (for example, an IP address or a MAC address) for communicating with the information processing apparatus 101 in an NFC communication unit 310 and a BLE communication unit 311 described later, and the information processing apparatus 101 can acquire the connection information of them. In this case, the information processing apparatus 101 starts connection with the image forming apparatus 104 based on the acquired connection information. Hereinafter, when simply described as "near field wireless communication", it means wireless communications between the information processing apparatus 101 and the image forming apparatus 104.

Figure 2:
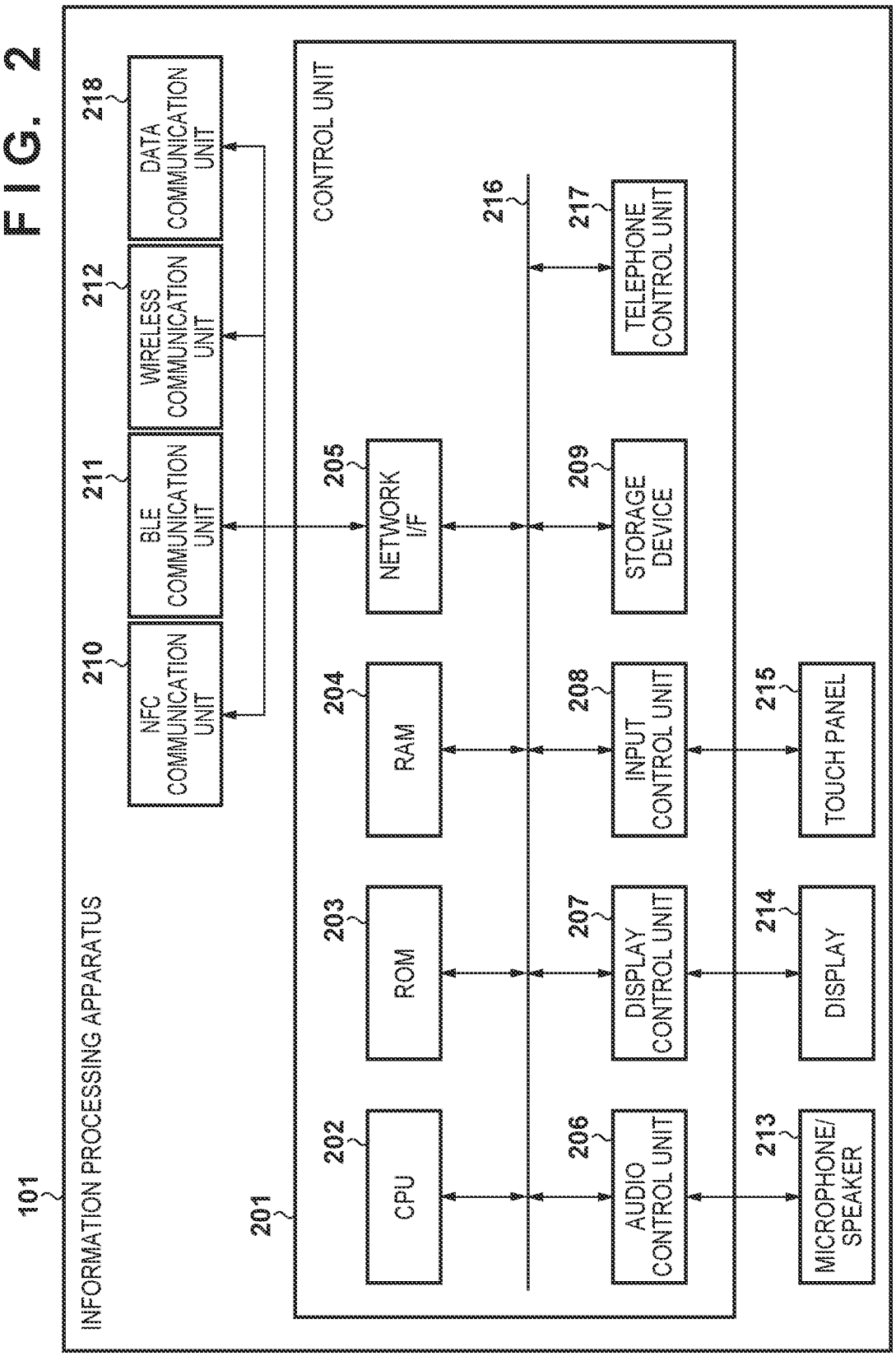
FIG. 2 is a diagram illustrating an example of a hardware configuration of an information processing apparatus according to the first embodiment.

FIG. 2 is a block diagram illustrating an example of a hardware configuration of the information processing apparatus 101 according to the present embodiment. The information processing apparatus 101 includes a control unit 201 and controls various communication units including an NFC communication unit 210, a BLE communication unit 211, a LAN communication unit 212, and a data communication unit 218, and various UI units including a microphone/speaker 213, a display 214, and an input unit 215.

The control unit 201 includes a CPU 202, a ROM 203, a RAM 204, a network interface (I/F) 205, an audio control unit 206, a display control unit 207, an input control unit 208, a storage device 209, and a telephone control unit 217. Each of the functional units included in the control unit 201 is connected by a system bus 216.

The CPU 202 is a central processing unit and controls the entire system of the information processing apparatus 101. The ROM 203 stores an application for controlling, for example, an OS of the information processing apparatus 101, a call, or data communications, and the CPU 202 reads them to execute various programs. The RAM 204 is a memory for the CPU 202 to execute various programs, and is a work memory in which the program is executed by the application. The storage device 209 is a non-volatile storage device, and stores, for example, settings or operation logs of various operation modes that need to be held after rebooting the information processing apparatus 101.

The network I/F 205 is connected to various communication units including the NFC communication unit 210, the BLE communication unit 211, the LAN communication unit 212, and the data communication unit 218, and controls various wireless communications with a base station (not illustrated) that handles the image forming apparatus 104 or a telephone line.

The audio control unit 206 performs input/output control of audio data via the microphone/speaker 213. The microphone/speaker 213 is, for example, a sound collecting unit included in the information processing apparatus 101, and may acquire a voice of the user as an input. The microphone/speaker 213 is, for example, a speaker included in the information processing apparatus 101 and may perform notification by voice according to, for example, a result of processing.

The display control unit 207 performs output control of image data displayed on the display 214. The configuration of the display 214 is not especially limited as long as the display 214 is a display unit for displaying, for example, processing result to the user, and may be, for example, a liquid crystal display or a touch panel that also serves as the input unit 215.

The input control unit 208 performs input control of information instructed by the user via the input unit 215. The input unit 215 may be, for example, a touch panel or a button provided to a mobile terminal, or may be, for example, a keyboard. In the present embodiment, the various applications operated in the information processing apparatus 101 are provided to the user using these various UI units. By the user inputting the destination information via the input control unit 208, job setting information including the destination information in a format input in the telephone function is generated and transmitted to the image forming apparatus 104.

The telephone control unit 217 performs control for making a phone call to the destination input by the user, or communicates with a base station that handles a telephone line via the data communication unit 218.

In the present embodiment, the destination information indicating a destination to which a fax is transmitted (for example, based on an input by the user) is set to the information processing apparatus 101. Here, for example, the destination information input by the user by the input control unit 208 is set as the destination. The destination information according to the present embodiment includes a telephone number. This destination information may include a code indicating an instruction (e.g., an instruction indicating a pause function) in the telephone function in addition to the telephone number. Here, the one recognized as the instruction in the telephone function is not particularly limited, and a code, such as a character string comma "," (corresponding to the pause function) or a character string semicolon ";" (corresponding to a standby function) may be used. Here, the pause function is a function (also referred to as "dial 0 call") that makes a phone call by inputting "," and generate standby time of several seconds to enables, for example, switching between an extension line and an external line.

Next, the information processing apparatus 101 determines whether a code indicating the instruction in the telephone function is included in the set destination information. In a case where it is determined that the destination information includes the code indicating the instruction in the telephone function, the information processing apparatus 101 converts the code into a code in the fax transmission function of the image forming apparatus 104. Furthermore, the information processing apparatus 101 transmits the converted destination information to the image forming apparatus 104, and the image forming apparatus 104 performs fax transmission. Hereinafter, when it is simply referred to as "destination", the description will be given as indicating a destination to which a fax is transmitted. In addition, the conversion of code is also expressed as conversion of instruction.

The destination information according to the present embodiment is transmitted/received as being included in the "job setting information" between the information processing apparatus 101 and the image forming apparatus 104. In particular, in the present embodiment, when the job setting information is transmitted to the image forming apparatus 104, in a case where the destination information included in the job setting information includes a code indicating the instruction in the telephone function, the code is converted into the code in the fax transmission function. Transmission and reception processing of job setting information will be described later.

Figure 3:
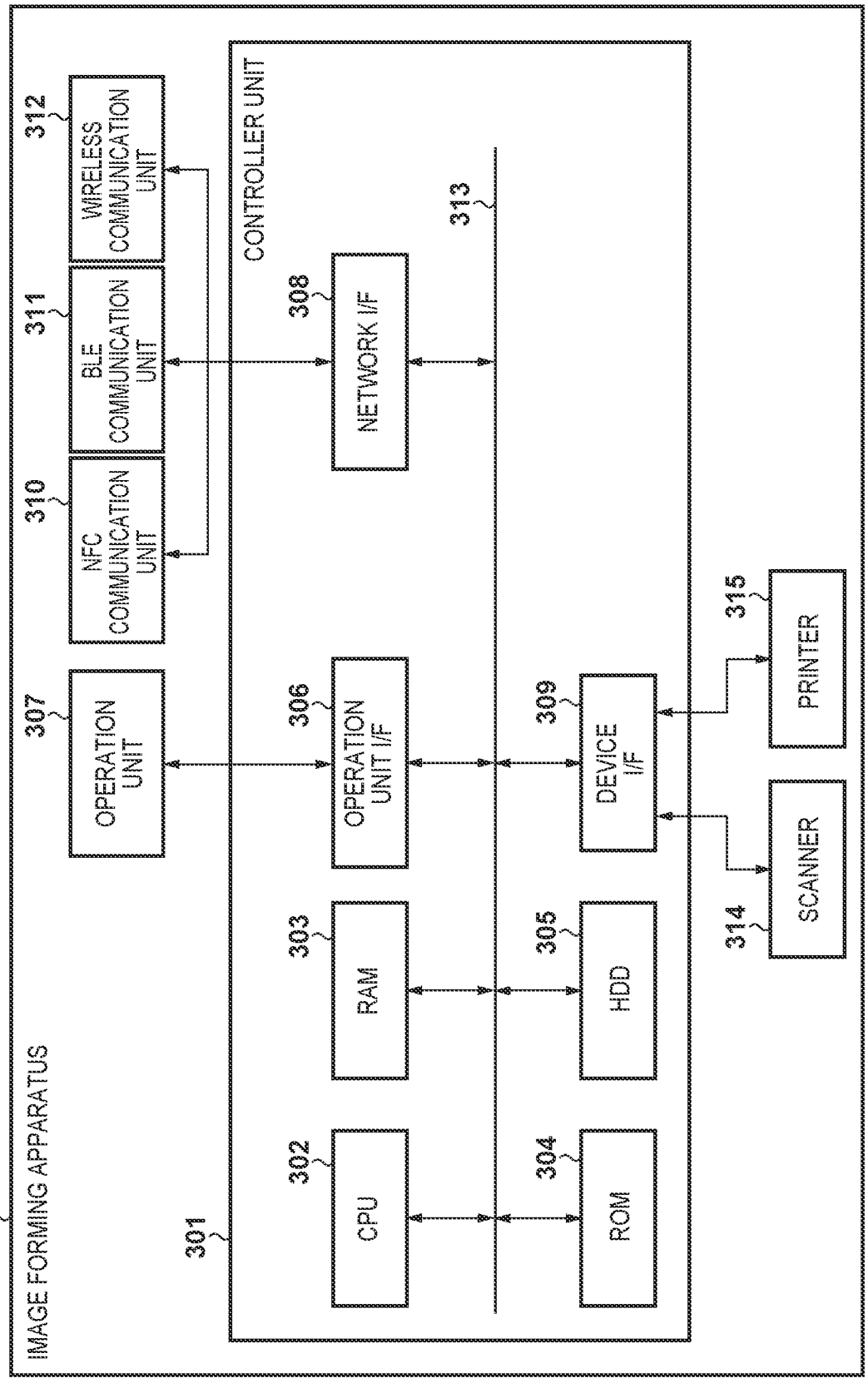
FIG. 3 is a diagram illustrating an example of a hardware configuration of an image forming apparatus according to the first embodiment.

FIG. 3 is a block diagram illustrating an example of a hardware configuration of the image forming apparatus 104 according to the present embodiment. The image forming apparatus 104 includes a control unit 301 and controls each communication unit including an operation unit 307, the NFC communication unit 310, the BLE communication unit 311, and a LAN communication unit 312, and a scanner 314 and a printer 315.

When the user uses a copy function, the control unit 301 controls the scanner 314 to acquire image data of a document and controls the printer 315 to print and output the image to a paper. In a case where the user uses a scan function, the control unit 301 controls the scanner 314 to acquire the image data of the document and converts the image data into code data, and transmits it to, for example, the information processing apparatus 101 via the network 103. In a case where the user uses a print function, the control unit 301 receives the image data (code data) via the information processing apparatus 101 or the network 103, converts the received image data into print data, and transmits the print data to the printer 315. The printer 315 then prints and outputs the image on a paper based on the received print data. These copy function, scan function, and print function can be performed by the known techniques, and thus detailed description thereof will be omitted.

In addition, the image forming apparatus 104 has a FAX reception function that receives data from, for example, an ISDN and prints the data and a FAX transmission function that transmits scanned data to, for example, an ISDN. The execution instruction of processing in each of these functions is referred to as a job, and the image forming apparatus 104 performs predetermined processing in accordance with the job corresponding to each function.

The control unit 301 includes a CPU 302, a RAM 303, a ROM 304, an HDD 305, an operation unit I/F 306, a network I/F 308, and a device I/F 309. Each of the functional units included in the control unit 301 is connected by a system bus 313.

The CPU 302 is a central processing unit and controls the entire system of the image forming apparatus 104. The RAM 303 is a system work memory for the image forming apparatus 104 to operate and temporarily stores image data. The RAM 303 may store scanned image data read by the scanner 314, and may store printed image data received from the information processing apparatus 101 via the network 103. In the RAM 303 according to the present embodiment, programs and data of, for example, an OS, system software, or application software are arranged. The ROM 304 stores a boot program of the system of the image forming apparatus 104. The HDD 305 stores, for example, various pieces of data of an OS, system software, or application software, or image data or setting data.

The operation unit I/F 306 outputs information to be displayed on the operation unit 307 to a display unit of the operation unit 307. Furthermore, the operation unit I/F 306 acquires information indicating the input by the user via the operation unit 307. In the present embodiment, the operation unit 307 is, for example, various buttons, a touch panel, or a dial included in the image forming apparatus 104, which is a digital multifunction machine, and the operation unit I/F 306 acquires operations to them by the user.

The network I/F 308 connects to various communication units including the NFC communication unit 310, the BLE communication unit 311, and the LAN communication unit 312, and controls various wireless communications with the information processing apparatus 101. The LAN communication unit 312 forms a connection with the information processing apparatus 101 by wireless LAN via the network 103. The NFC communication unit 310 and the BLE communication unit 311 form a short-range wireless signal with the information processing apparatus 101 via a wireless signal. In the present embodiment, the image forming apparatus 104 transmits/receives the job setting information and the image data to/from the information processing apparatus 101, and performs jobs in response to execution commands of various functions of the image forming apparatus 104 from the information processing apparatus 101 via the network I/F 308.

The device I/F 309 connects the scanner 314, which reads the image data, and the printer 315, which prints the image data, and the control unit 301, and inputs/outputs the image data.

Figure 4:
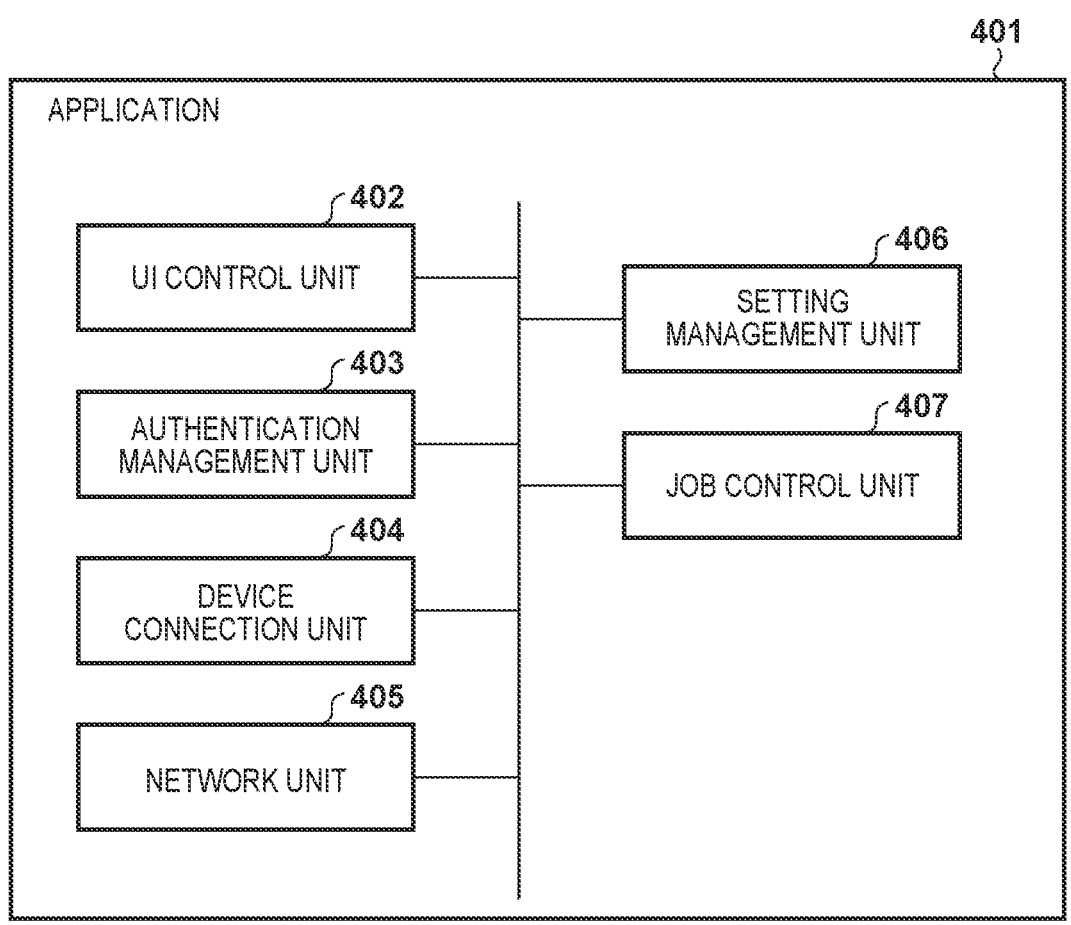
FIG. 4 is a diagram illustrating an example of a functional configuration of the information processing apparatus according to the first embodiment.

FIG. 4 is a block diagram illustrating an example of a functional configuration of the information processing apparatus 101 according to the present embodiment. In the example of FIG. 4, an application 401 is software executed by the CPU 202 in the information processing apparatus 101 and is stored in the RAM 204. The fax transmission processing by the information processing apparatus 101 and the image forming apparatus 104 will be described below, but detailed description of general processing will be omitted.

A UI control unit 402 receives the job setting information input with the touch panel 215 by the user, and transmits the job setting information to a setting management unit 406 via the input control unit 208. Additionally, the UI control unit 402 receives a response from the setting management unit 406 or a job control unit 407, and outputs the response to the display 214 via the display control unit 207. Furthermore, the UI control unit 402 receives authentication information input by the user on the touch panel 215 and transmits the authentication information to an authentication management unit 403 via the input control unit 208.

The authentication management unit 403 transmits the authentication information to a network unit 405 based on user information received from the UI control unit 402. This authentication information is used in authentication processing (described later using a flowchart) in the image forming apparatus 104 via the network 103.

A connection unit 404 establishes communications between the information processing apparatus 101 and the image forming apparatus 104 and communications via the network. In the present embodiment, the connection unit 404 can establish near field wireless communication between the information processing apparatus 101 and the image forming apparatus 104 by NFCs or BLEs and wireless LAN communications via the network 103. When, for example, the NFCs are used, the user approaches the NFC communication unit 210 of the information processing apparatus 101 and the NFC communication unit 310 of the image forming apparatus 104 so as to be in contact with one another to start near field wireless communication by the connection unit 404. For example, with the use of BLEs, the user approaches the distance between the BLE communication unit 211 of the information processing apparatus 101 and the BLE communication unit 311 of the image forming apparatus 104, and when the connection unit 404 determines that the distance is a distance at which intensity of the BLEs is a certain intensity or more, near field wireless communication starts. In this way, the connection unit 404 acquires apparatus information of the image forming apparatus 104 by performing an operation (referred to as a touch operation) of approaching the NFC or BLE communication units of the information processing apparatus 101 and the image forming apparatus 104 by the user, thus ensuring starting near field wireless communication. Also, from the apparatus information of the image forming apparatus 104 thus acquired, the connection unit 404 can start wireless LAN connection via the network 103. The processing related to the near field wireless communication and the wireless LAN connection is the known techniques, and therefore the detailed description thereof will be omitted. As long as similar data transmission reception is possible, a different type of communication processing may be used instead of them.

The network unit 405 transmits/receives data to/from the image forming apparatus 104. In the present embodiment, the network unit 405 can transmit, for example, job setting, a job execution instruction command, image data, or user authentication information to the image forming apparatus 104 via the network 103. The network unit 405 may receive the job setting information stored in the image forming apparatus 104 via the network 103.

The setting management unit 406 stores the job setting information input by the user with the UI control unit 402 or the job setting information received from the image forming apparatus 104 by the network unit 405 in the RAM 204 or the storage device 209. Here, the setting management unit 406 may manage the job setting information as a setting ("favorite") frequently used by the user. Furthermore, the setting management unit 406 may manage custom job setting stored in, for example, the RAM 204 or the storage device 209 during installation of the application 401 as "preset". The job setting information according to the present embodiment may include destination information indicating the destination.

The job control unit 407 generates job execution instruction information from the job setting (including, for example, "favorite" and "preset") stored in the setting management unit 406, and transmits a job execution request to the image forming apparatus 104 via the network 103. The job control unit 407 may acquire a job execution status or the operation state of the device, such as the scanner 314 and the printer 315, from the image forming apparatus 104 via the network 103, and transmit it to the UI control unit 402.

In a case where the destination information included in the job setting information includes a code indicating the instruction in the telephone function, a conversion unit 408 converts the code into the code in the fax transmission function of the image forming apparatus 104. In the present embodiment, the conversion unit 408 determines whether a character string indicating a pause instruction or a tone instruction is included in addition to the telephone number in the destination of the job setting information, and when the character string is included, the conversion unit 408 converts the character string into a corresponding character string in the fax transmission function.

Figure 5:
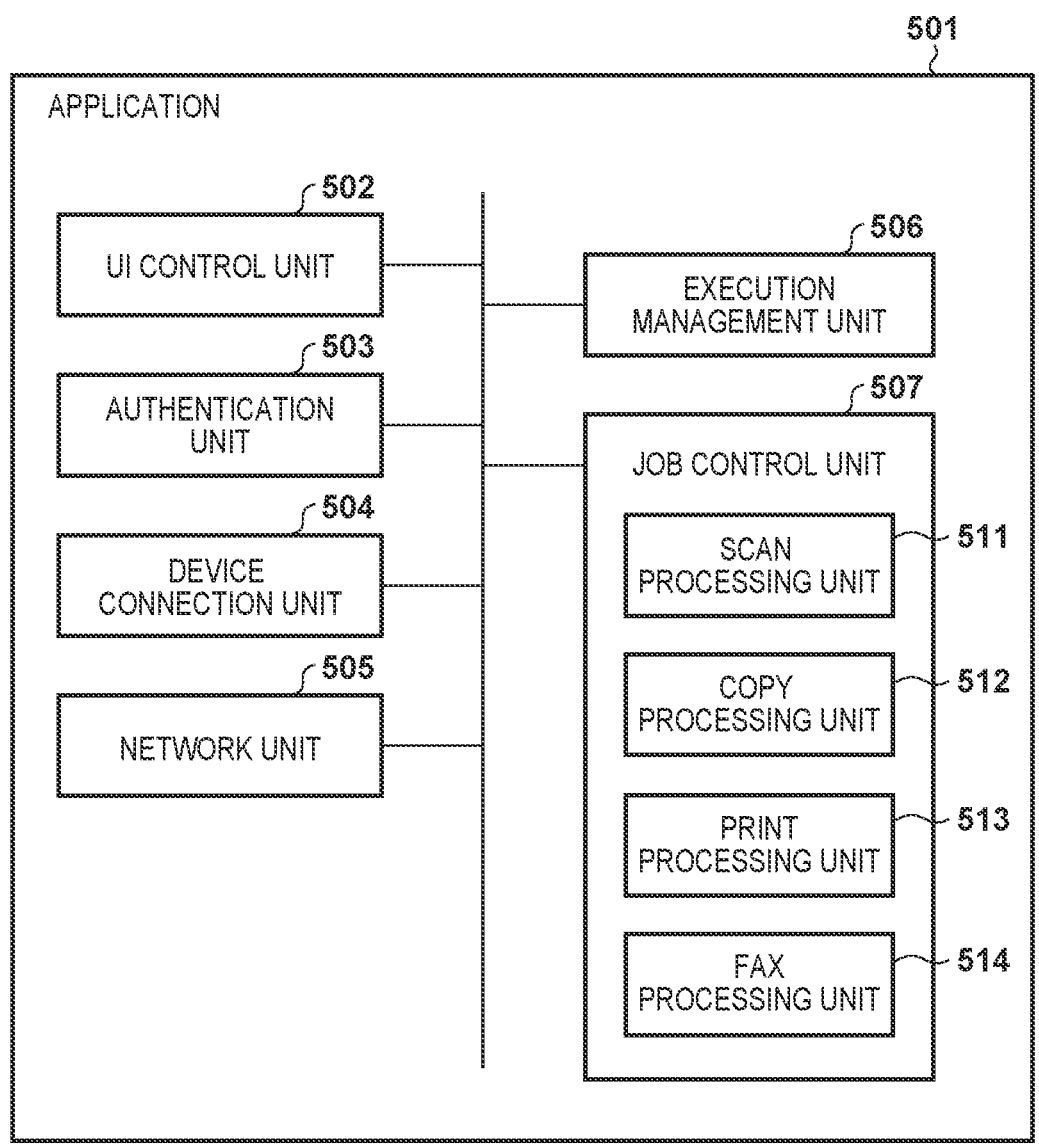
FIG. 5 is a diagram illustrating an example of a functional configuration of the image forming apparatus according to the first embodiment.

FIG. 5 is a block diagram illustrating a software configuration of the image forming apparatus 104 according to the present embodiment. In the example of FIG. 4, the application 401 is software executed by the CPU 302 in the image forming apparatus 104 and is stored in the RAM 303.

A UI control unit 502 receives the job setting information input with the operation unit 307 by the user, and transmits the job setting information to an execution management unit 506. The UI control unit 502 receives a response from the execution management unit 506 or a job control unit 507, and outputs the response to the operation unit 307. An authentication unit 503 performs user authentication processing based on the authentication information received from the information processing apparatus 101, and returns the result to the information processing apparatus 101.

A connection unit 504 performs handover between the information processing apparatus 101 and the image forming apparatus 104 by near field wireless communication to establish wireless LAN communications via the network 103.

A network unit 505 transmits/receives data to/from the information processing apparatus 101. In the present embodiment, the network unit 505 can receive, for example, job setting, a job execution instruction command, image data, or user authentication information from the information processing apparatus 101 via the network 103. The network unit 505 may transmit the job setting information stored in the image forming apparatus 104 to the information processing apparatus 101 via the network 103.

The execution management unit 506 stores the job setting information input with the UI control unit 502 by the user or the job setting information received from the information processing apparatus 101 by the network unit 505 in the RAM 303 or the HDD 305. Here, the execution management unit 506 may manage the job setting information as a setting ("favorite") frequently used by the user. Furthermore, the execution management unit 506 may manage custom job setting stored in, for example, the RAM 303 or the HDD 305 during installation of an application 501 as "preset".

The job control unit 507 controls a fax processing unit 514 in accordance with the job setting received from the information processing apparatus 101, or the job setting (including, for example, "favorite" and "preset") stored in the execution management unit 506, and performs the fax transmission processing. The job control unit 507 can control a scan processing unit 511, a copy processing unit 512, or a print processing unit 513 in accordance with the received job setting or the job setting stored in the execution management unit 506, and perform various jobs. The job setting information that is referred to perform the job by the job control unit 507 may be received from the information processing apparatus 101 (by near field wireless communication or wireless LAN communication) as described above, or may be information input on the image forming apparatus 104 by the UI control unit 502. The job control unit 507 may transmit a job execution status or the operation state of the device, such as the scanner 314 and the printer 315, to the information processing apparatus 101 via the network 103.)

Figure 6A:
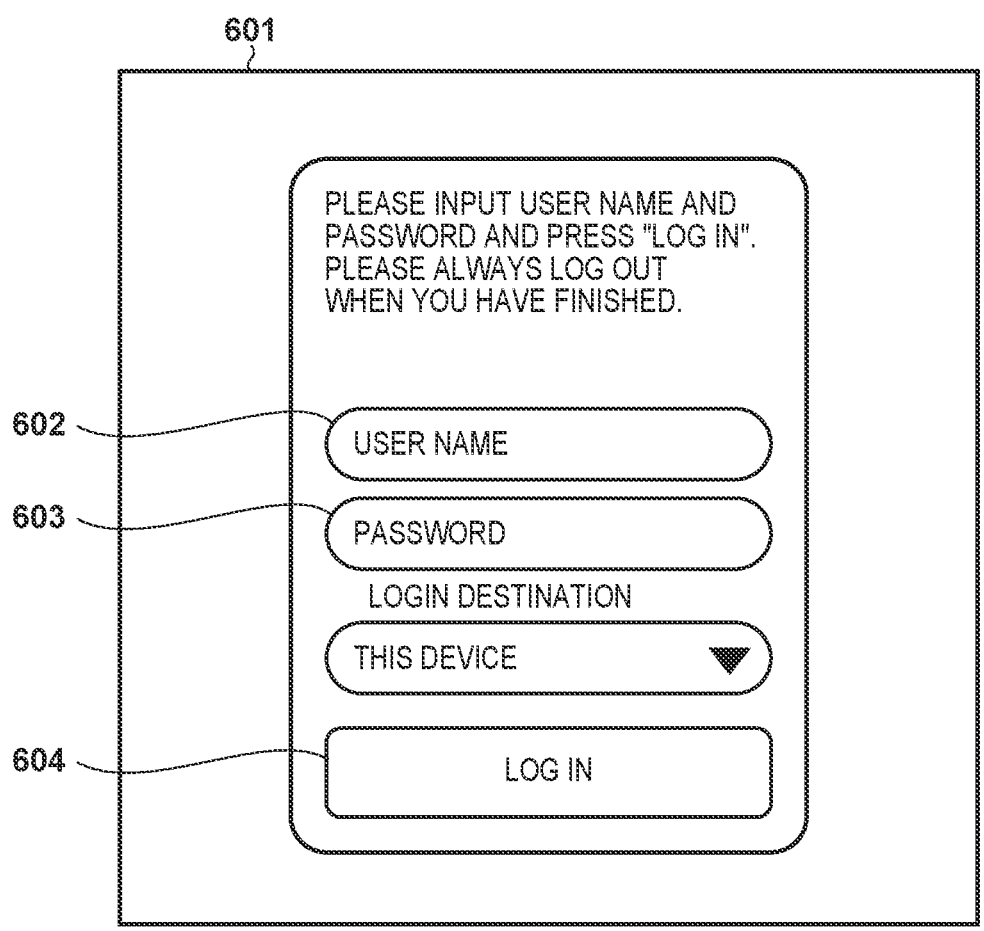

Next, with reference to FIG. 6A to FIG. 6C, a UI (operation panel) of the operation unit I/F of the image forming apparatus 104 will be described. FIG. 6A is a diagram illustrating an example of an authentication screen of the image forming apparatus 104 according to the present embodiment. A login screen 601 is a screen for performing user authentication, and user information is input to an input field 602 for inputting a user name of a user who performs local login, and an input field 603 for inputting a password. Here, the local login is to input user information to the authentication screen of the operation panel and login. In the login screen 601, when a login button 604 is pressed, the local login starts using the user name and the password input to the input field 602 and the input field 603.

Figure 6B:
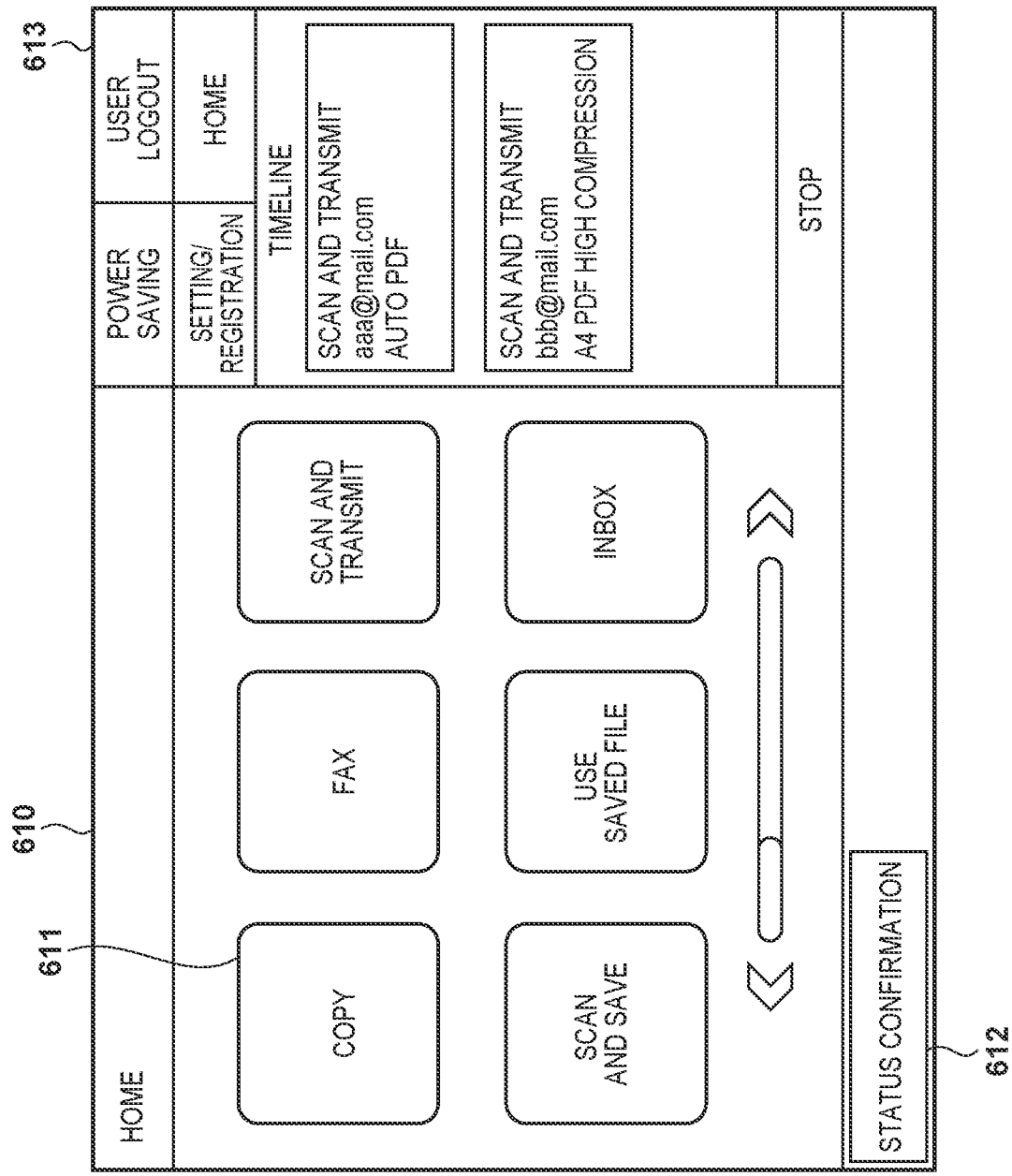

FIG. 6B is a diagram illustrating an example of a home screen of the image forming apparatus 104. A home screen 610 is a screen that lists and displays the functions of the image forming apparatus 104, and displays a UI for selecting a function that the user wants to use. A copy button 611 is a button used in performing the copy function, and when pressed, the home screen 610 transitions to a setting screen (not illustrated) of copy. A status confirmation button 612 is a button used to refer to, for example, a job execution status and a log, and when pressed, the home screen 610 transitions to a status confirmation screen (not illustrated) that displays the statuses. A logout button 613 is a button used to log out, and when pressed, logout is performed, and the home screen 610 transitions to the login screen 601. The logout button 613 may display the user name during login.

Figure 6C:
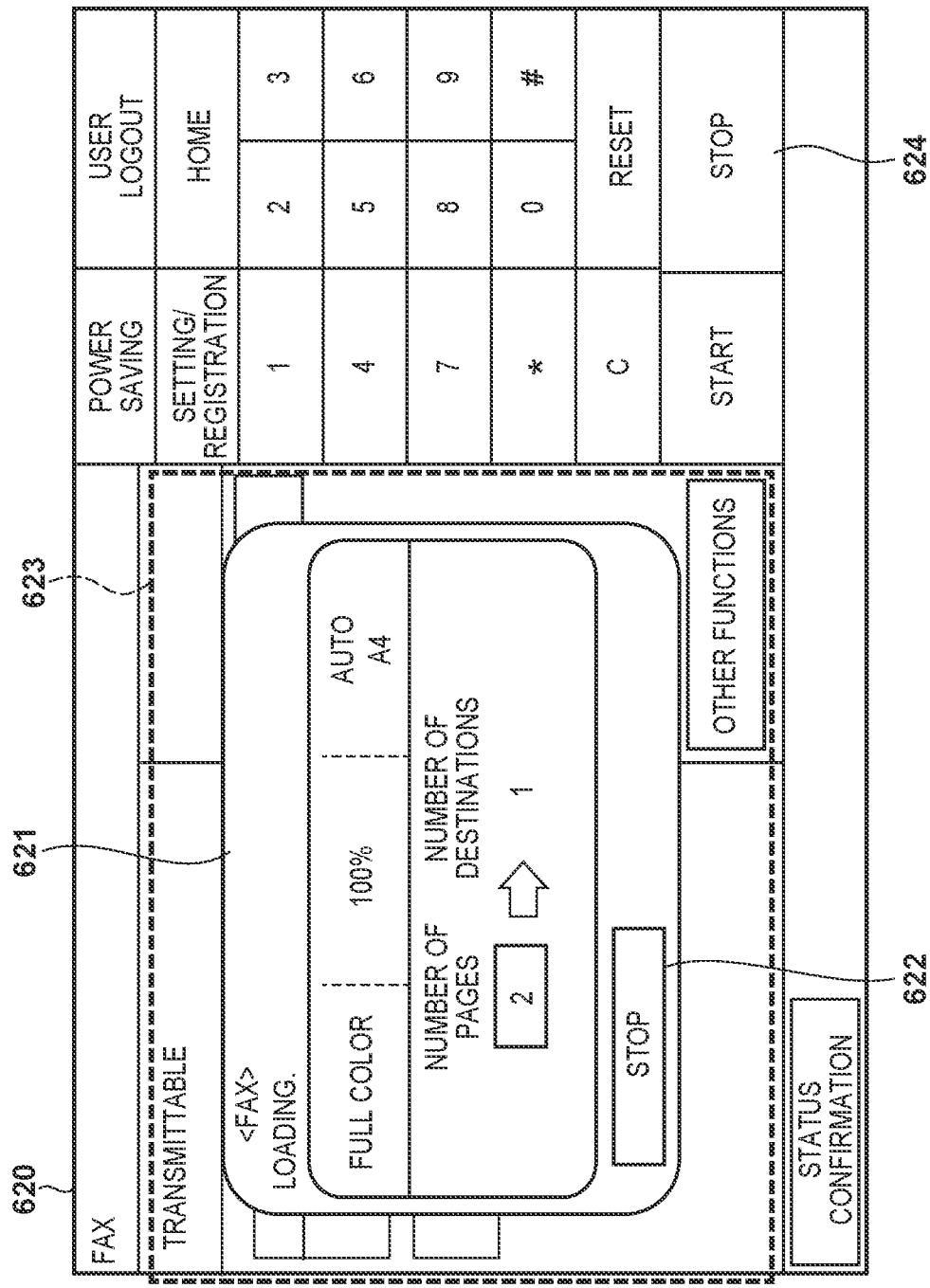

FIG. 6C is a diagram illustrating an example of a fax transmission screen of the image forming apparatus 104. A fax screen 620 is a screen for setting regarding fax, and displays a UI for selecting a destination or setting a scan in a fax setting area 623. In the example of FIG. 6C, the fax transmission function is in execution, and a scan-in-execution display 621 is displayed on the fax screen 620. During display of the scan-in-execution display 621, setting by pressing various buttons disposed in the fax setting area 623 of the fax screen 620 cannot be performed. An abort button 622 is a button for aborting the job, and when pressed, the job (fax in the example of FIG. 6C) is aborted, and the fax screen 620 transitions to the login screen 601 or the home screen 610. A stop button 624 is a button for canceling the job in execution, and when pressed, the job (fax in the example of FIG. 6C) is canceled, and display of the scan-in-execution display 621 is stopped.

FIG. 6D is a diagram illustrating an example of the fax transmission screen of the image forming apparatus 104 when the destination includes a pause instruction. A destination 630 is a text field to which the user can input the destination. For example, the destination 630 can display a number input with a soft keyboard 632, a character string input with a button, such as a pause button 631, or a destination included in the job setting information. In the example of FIG. 6D, the instruction of the pause function is displayed as "P", and the fax processing unit 514 interprets this "P" as the pause instruction.

Figure 7A:
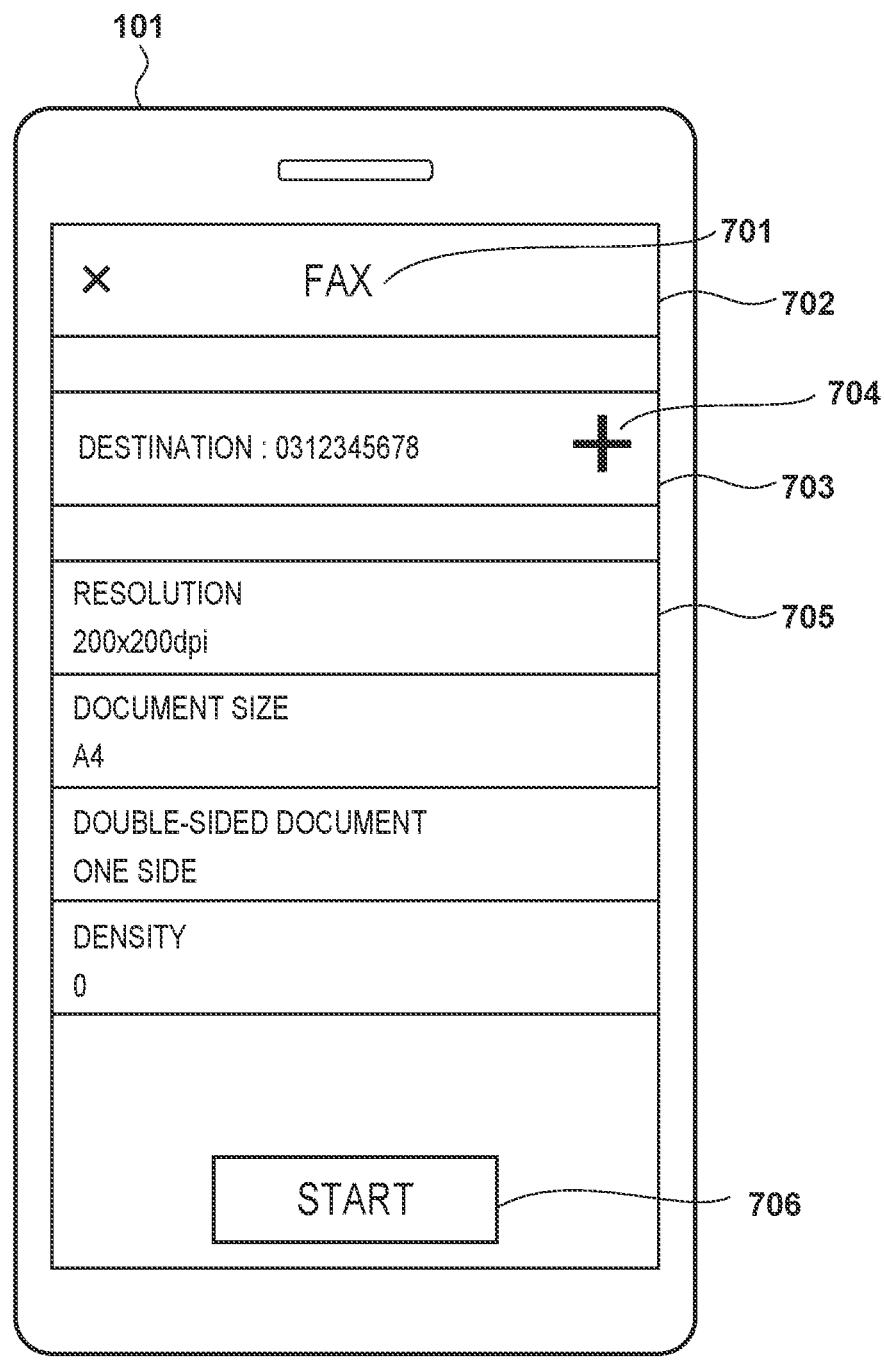
FIG. 7A and FIG. 7B are diagrams illustrating an example of a UI of the information processing apparatus according to the first embodiment.

Next, with reference to FIGS. 7A and 7B, fax setting of the information processing apparatus 101 will be described. FIG. 7A is a diagram illustrating an example of a fax screen displayed in the information processing apparatus 101. A fax transmission screen 701 is a screen for performing a setting for fax transmission in the image forming apparatus 104. A title 702 displays a title (here, contents of job, such as fax or print), and further includes a button for canceling the setting and returning to the previous screen as "x". A destination setting area 703 is a text field to which the destination for fax transmission can be input (e.g., with a soft keyboard). A screen when the soft keyboard starts will be described in FIG. 7B.

An address book start button 704 is a button for starting an address book of the information processing apparatus 101. When the user selects a telephone number in the address book, the phone number is set as the destination, and the selected telephone number is displayed in the destination setting area 703. When a resolution setting item 705 is pressed, the fax transmission screen 701 transitions to a resolution setting screen (not illustrated) for changing resolution setting and the resolution setting set in the resolution setting screen is represented in the lower stage. The description for the other setting items will be omitted. When a start button 706 is pressed, the set fax information (the telephone number of the destination) and the scan setting are transmitted to the image forming apparatus as the job setting information and the job execution is instructed. Here, the scan setting is a setting for using the scan function of the image forming apparatus 104 and can be input in the fax transmission screen 701. However, the setting is used in a typical scan function, and therefore a detailed description thereof will be omitted.

Figure 7B:
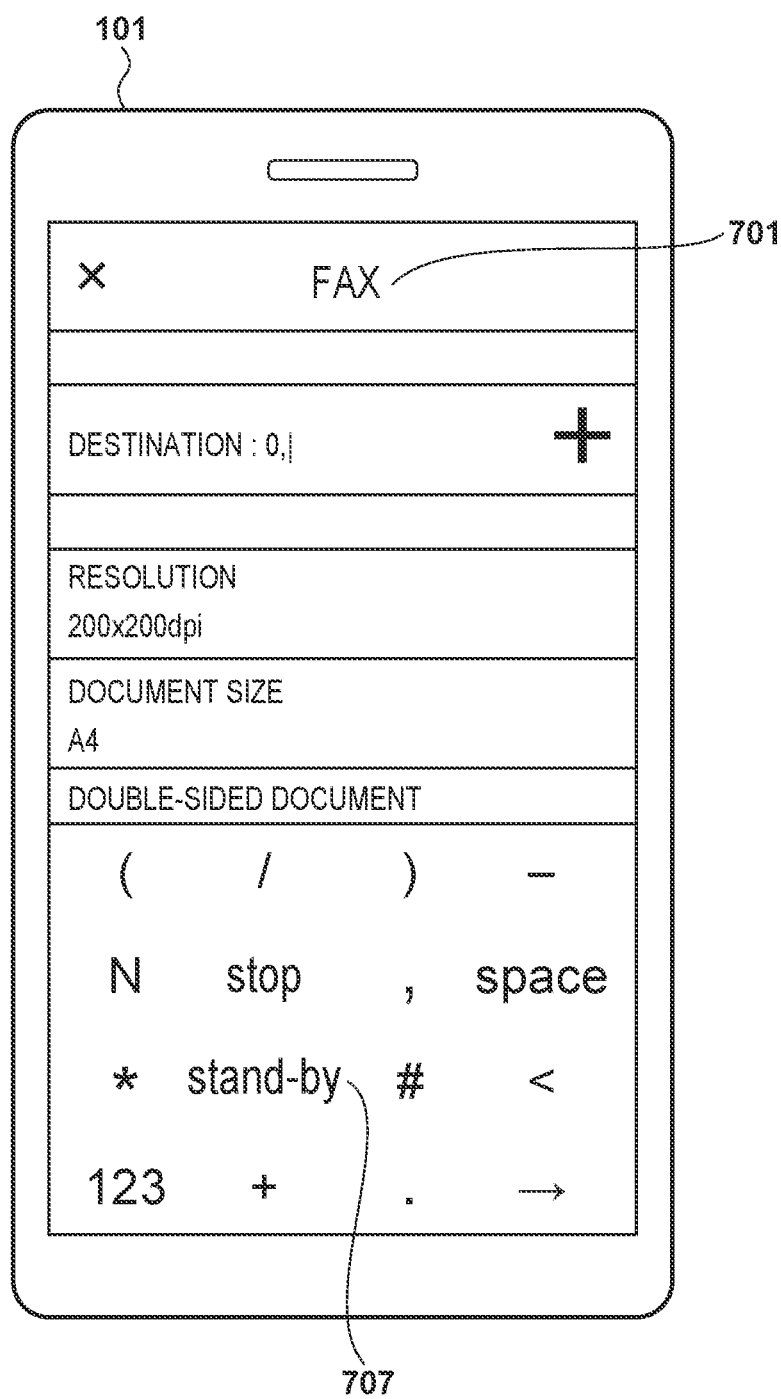

FIG. 7B is a diagram illustrating a scene in which the soft keyboard starts to input the destination to the destination setting area 703 in the fax screen of the information processing apparatus 101. A standby button 707 is a button for inputting a character string indicating the pause instruction in the telephone function of the information processing apparatus 101 to the destination. Note that the telephone function of the information processing apparatus 101 interprets a character string comma "," as the pause instruction, and also in the example of FIG. 7B, the pause instruction is displayed as the character string comma ",". The destination setting area 703 in FIG. 7B is a display in which zero and the pause instruction are input.

Figure 8A:
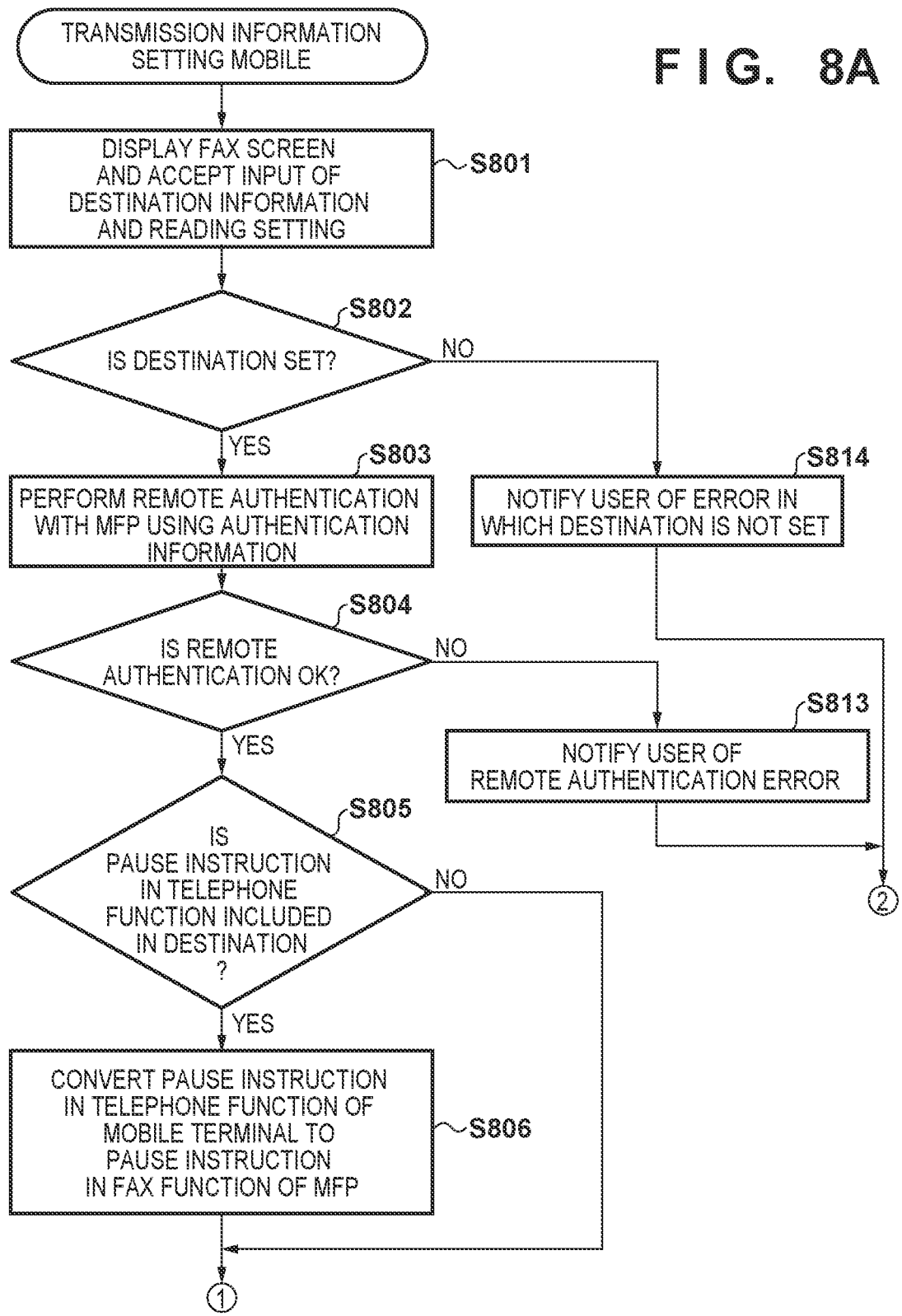

Next, with reference to FIG. 8A and FIG. 8B, flows of processing when the information processing apparatus 101 is operated and the image forming apparatus performs fax transmission will be described. Each operation depicted in the flowcharts of FIG. 8A and FIG. 8B (represented by step, S) is achieved by reading a program for achieving each control module stored in the ROM 203 or the storage device 209 on the RAM 204 and executing it by the CPU 202.

In S801, the CPU 202 accepts the input of the job setting information including the destination information by the user. In the example of FIG. 7A, the CPU 202 accepts the input of the destination information of fax and the scan setting in the fax transmission screen 701.

In S802, the CPU 202 determines whether the destination is set in the job setting information accepted by the input in S801 when the user has performed the start instruction of processing. When the destination has been set, the processing proceeds to S803, and otherwise the processing proceeds to S814. In S814, the CPU 202 notifies the user of an error in which the destination is not set to terminate the processing.

In S803, the CPU 202 performs remote authentication for communications with the image forming apparatus 104 using the authentication information managed by the authentication management unit 403. Here, the remote authentication is authentication of whether the image forming apparatus 104 permits connection via the network 103 from the information processing apparatus 101, and authentication is performed using user information registered with the image forming apparatus 104. In S804, the CPU 202 determines whether the result of remote authentication is OK and advances the processing to S805 when OK, and otherwise advances the processing to S813. In S813, the CPU 202 notifies the user of a remote authentication error to terminate the processing.

In S805, the CPU 202 determines whether the instruction in the telephone function of the information processing apparatus 101 is included in the destination. When the instruction is included, the processing proceeds to S806, and otherwise the processing proceeds to S807. In S806, the CPU 202 converts the instruction in the telephone function included in the destination to the instruction in the fax transmission function of the image forming apparatus 104, and advances the processing to S807. In this example, the CPU 202 converts "," indicating the pause instruction in the telephone function into "P" indicating the pause instruction in the fax transmission function.

In S807, the CPU 202 transmits the authentication information and the job setting information to the image forming apparatus 104 as the fax transmission information. In S808, the CPU 202 determines whether an error has been received from the image forming apparatus 104, advances the processing to S815 when the error has been received, and advances the processing to S809 when not received. In S815, the CPU 202 notifies the user of the error notification of job and terminates the processing.

In S809, the CPU 202 acquires the state of the execution management unit 506 of the image forming apparatus 104. In S810, the CPU 202 determines whether the image forming apparatus 104 stands by for job execution from the state acquired in S809, returns the processing to S809 when the image forming apparatus 104 stands by for job execution, and otherwise advances the processing to S811. Here, "stands by for job execution" is information indicating from when the image forming apparatus 104 receives the job setting information transmitted in S807 until the scan execution starts.

In S811, the CPU 202 notifies the user of job transmission completion, and performs logout of the remotely authenticated user from the image forming apparatus 104 in S812 to terminate the processing.

Figure 9A:
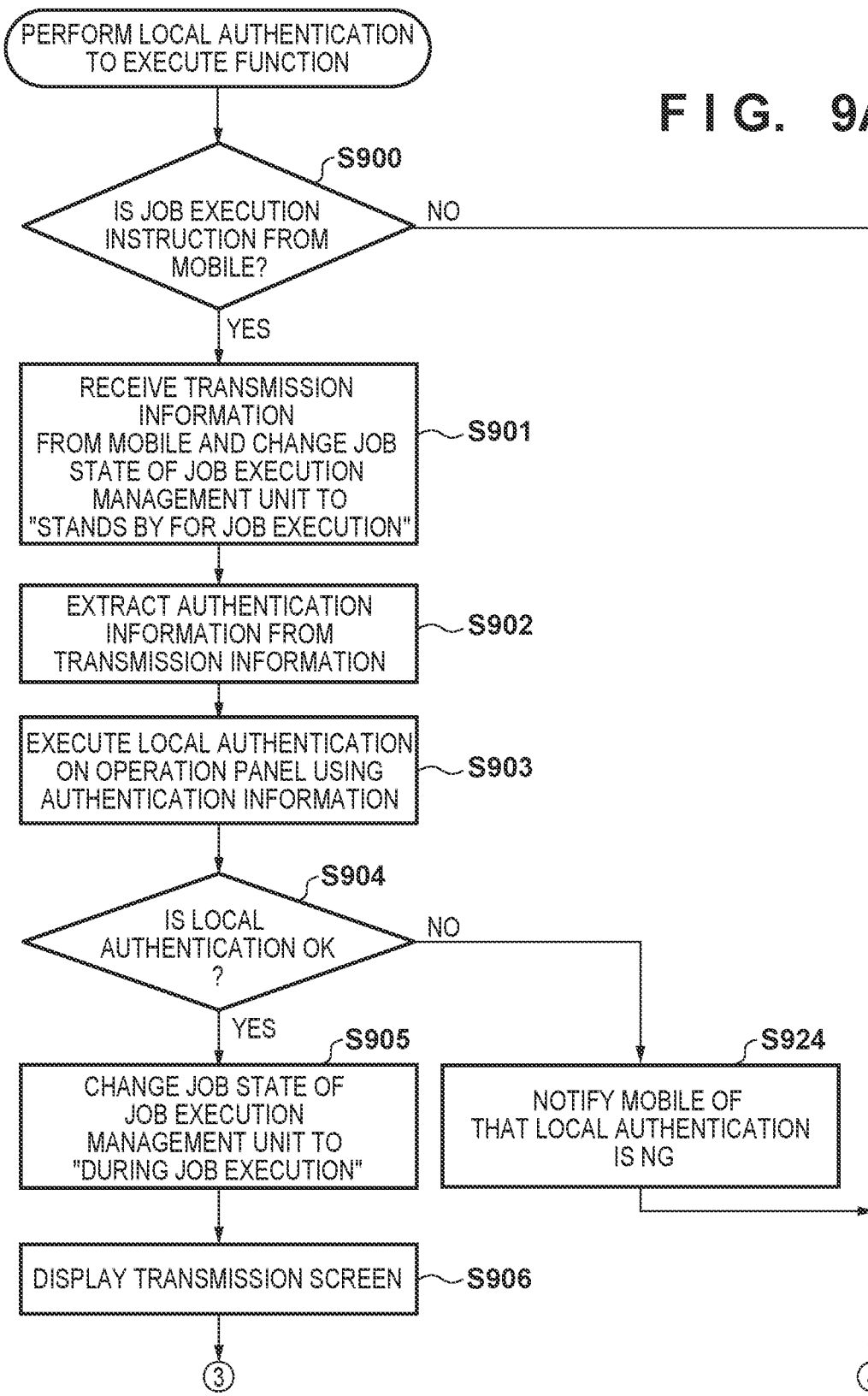
FIG. 9A, FIG. 9B and FIG. 9C are flowcharts depicting an example of fax transmission processing according to the first embodiment.
Figure 9B:
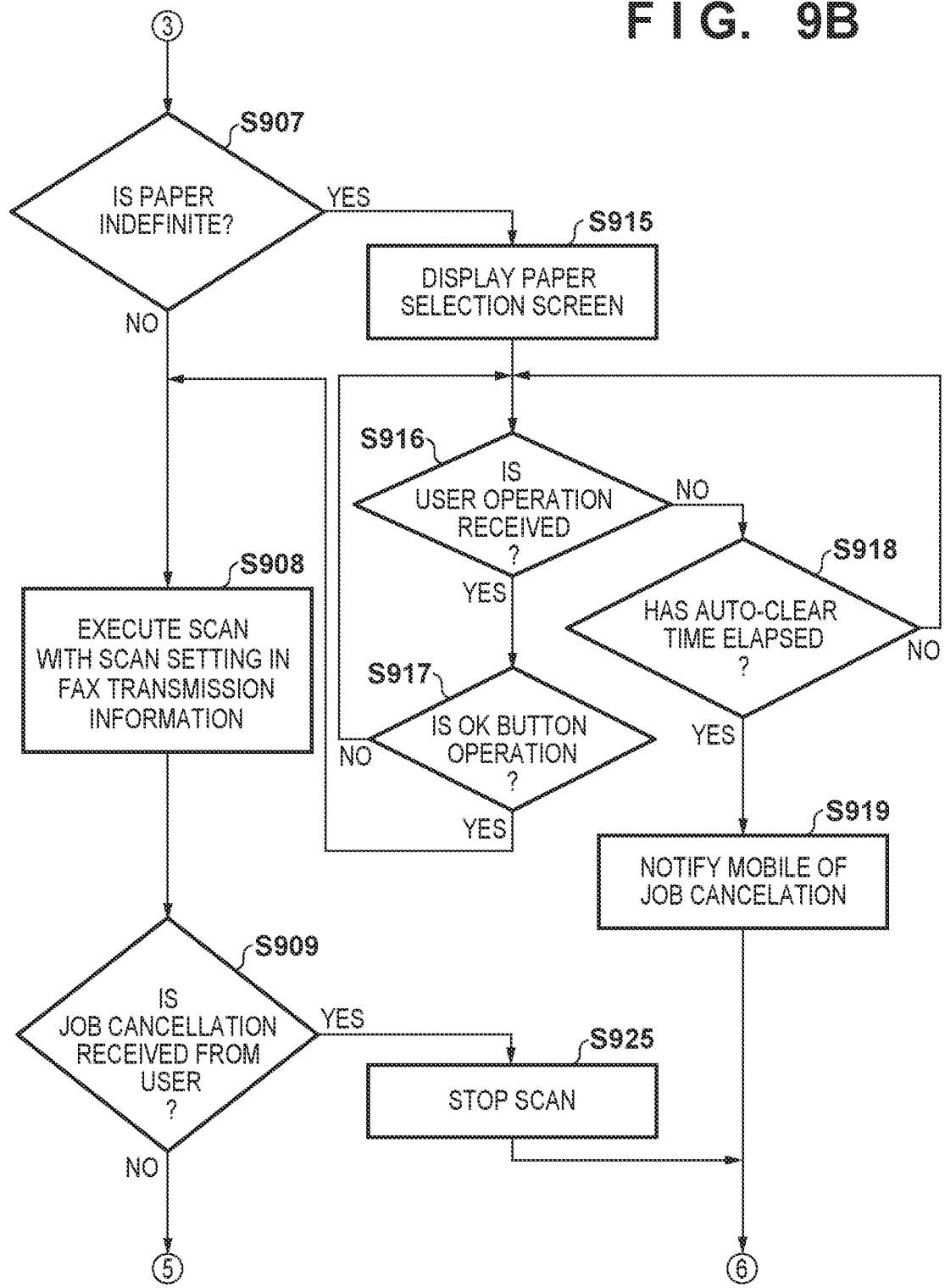
Figure 9C:
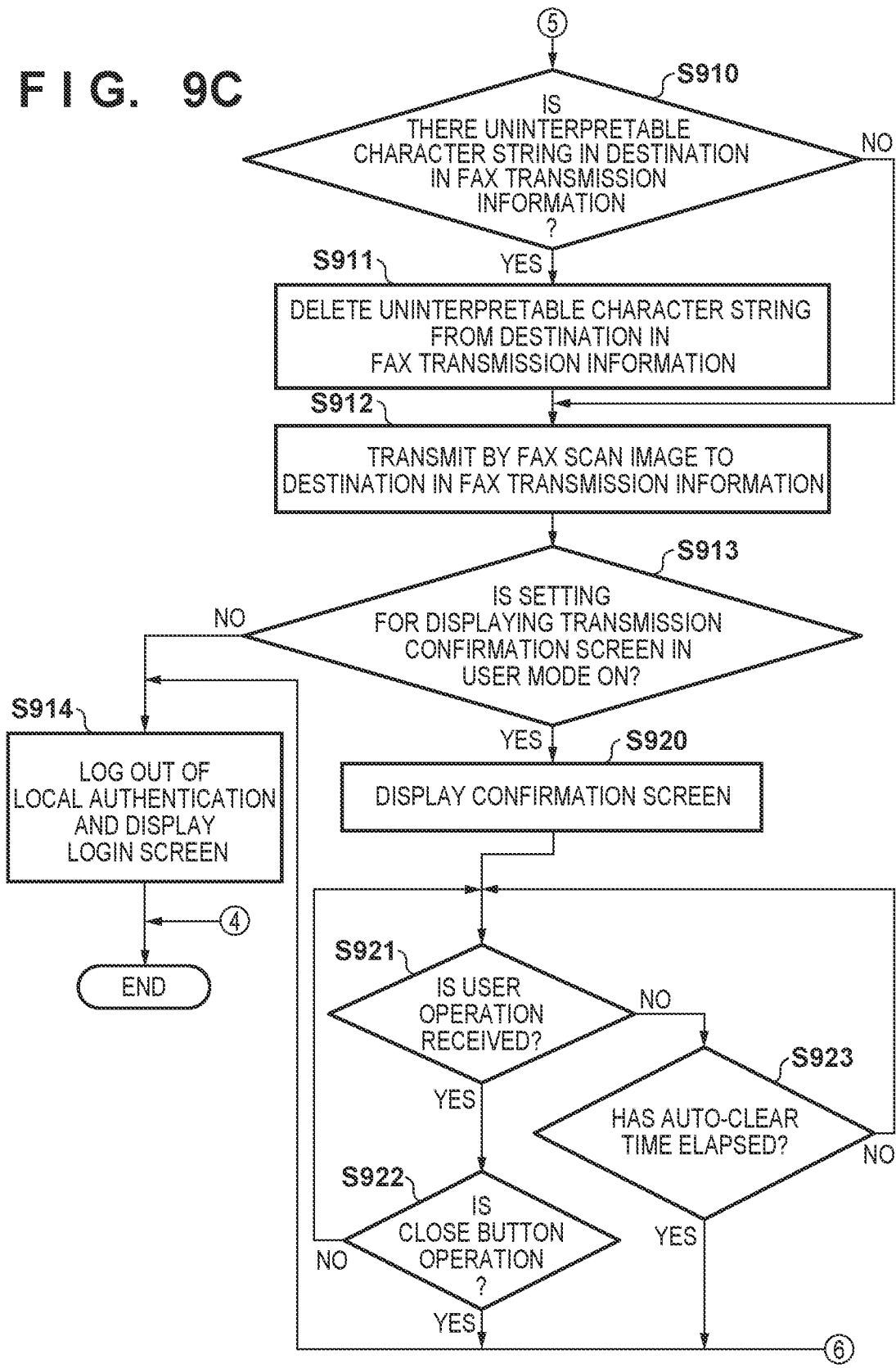

Next, with reference to FIG. 9A, FIG. 9B and FIG. 9C, the flows of the fax transmission processing of the image forming apparatus 104 will be described. Each operation depicted in the flowcharts of FIG. 9A, FIG. 9B and FIG. 9C is achieved by reading a program for achieving each control module stored in the ROM 304 or the HDD 305 on the RAM 303 and executing it by the CPU 302. Note that, for example, the processing illustrated in FIG. 9A, FIG. 9B and FIG. 9C starts when the user performs local login.

In S900, the CPU 302 determines whether the fax transmission information has been received from the information processing apparatus 101, advances the processing to S901 when the fax transmission information has been received and otherwise terminates the processing. In S901, the CPU 302 changes the job state of the execution management unit 506 to "stands by for job execution" (the initial setting of job state is no setting).

In S902, the CPU 302 refers to the authentication information included in the fax transmission information, and performs local authentication based on the authentication information in S903. In S904, the CPU 302 determines whether the local authentication is OK or FAIL, advances the processing to S905 when the local authentication is OK, and otherwise advances the processing to S924. In S924, the CPU 302 notifies the information processing apparatus 101 of the local authentication being FAIL and terminates the processing.

In S905, the CPU 302 changes the job state to during job execution, and causes the information processing apparatus 101 to display a screen indicating that fax transmission is in execution in S906. In S907, the CPU 302 determines whether a paper is indefinite. Here, when there is no document to be scanned in an ADF of the image forming apparatus 104 or a paper size cannot be detected on a document platen, it is determined that the paper is indefinite. In a case where it is determined that the paper is indefinite, the processing proceeds to S915, and otherwise the processing proceeds to S908.

In S908, the CPU 302 performs scan based on the scan setting included in the job setting information, and acquires a scan image. In S909, the CPU 302 determines whether an abort instruction of job (for example, by pressing the abort button 622 or the stop button 624 in FIG. 6C) has been performed while the scan that has started in S908 is in execution. In a case where the abort instruction of job has been performed, the processing proceeds to S925, and otherwise the processing proceeds to S910. In S925, the CPU 302 aborts the scan processing and terminates the processing.

In S910, the CPU 302 confirms whether an uninterpretable character string is not included in the destination included in the job setting information in the image forming apparatus 104. When the uninterpretable character string is included, the processing proceeds to S911, and otherwise the processing proceeds to S912. In S911, the CPU 302 deletes the uninterpretable character string in the destination, and advances the processing to S912. In the present embodiment, FIG. 11A illustrates a table indicating an example of a character string interpreted as the instruction in the fax transmission function (the character string "P" corresponding to the pause function and the character string "T" corresponding to the tone function). Here, the uninterpretable character string in the image forming apparatus 104 is assumed to be a character string (for example, the character string ":") that does not match the character string and a number corresponding to the fax transmission function as shown in FIG. 11A.

In S912, the CPU 302 transmits the scan image acquired in S908 to the destination included in the job setting information by the fax transmission function. Here, in S806, the fax is transmitted to the destination for which the instruction has been converted.

In S913, the CPU 302 confirms whether the setting for displaying the transmission confirmation screen in a user mode is ON, advances the processing to S920 when the setting is ON, and advances the processing to S914 when OFF. In S914, the CPU 302 logs out the locally authenticated user, displays the login screen, and terminates the processing.

In S920, the CPU 302 displays a transmission confirmation screen, and determines whether the input by the user has been received in the transmission confirmation screen in S921. When the input by the user has been received, the processing proceeds to S922, otherwise the processing proceeds to S923. In S922, the CPU 302 determines whether the input by the user is an operation of pressing a close button of the transmission confirmation screen, closes the transmission confirmation screen and advances the processing to S914 when the operation is the operation of pressing the close button, and otherwise returns the processing to S921. In S923, the CPU 302 determines whether auto-clear time (e.g., 10 seconds) has elapsed without receiving the input by the user in S921, closes the transmission confirmation screen and advances the processing to S914 when the auto-clear time has elapsed, and otherwise returns the processing to S921. Here, the auto-clear time is a time set to close the screen when the user operation is not performed for a certain period of time. The auto-clear time may be preset or may be arbitrarily settable by the user.

In S915 in a case where the paper is determined to be indefinite in S907, the CPU 302 displays a paper selection screen. In S916, the CPU 302 determines whether the input by the user has been received in the paper selection screen, advances the processing to S917 when the input has been received, and otherwise advances the processing to S918. In S917, the CPU 302 determines whether the received input is an operation of pressing the OK button, advances the processing to S908 when the operation is the operation of pressing the OK button, and otherwise returns the processing to S916. In S918, the CPU 302 determines whether the auto-clear time (e.g., 10 seconds) has elapsed without receiving the input by the user in S916, closes the paper selection screen and advances the processing to S919 when the auto-clear time has elapsed, and otherwise returns the processing to S916. In S919, the CPU 302 notifies the information processing apparatus 101 of the cancelation of job, and advances the processing to S914.

With the processing, the instruction in the telephone function of the information processing apparatus 101 included in the destination of fax can be converted into the instruction in the fax transmission function of the image forming apparatus 104, and the job instruction can be instructed to the image forming apparatus. Accordingly, even when the user inputs the instruction in the telephone function to the destination of fax, it can be interpreted as a similar instruction even in the fax transmission function of the image forming apparatus, and a fax can be transmitted to the destination intended by the user.

Note that, while the description has been given assuming that the scan image is transmitted by fax in the present embodiment, the above-described scan processing is not performed and different pieces of image data may be transmitted by fax. For example, the information processing apparatus 101 can transmit a desired image by fax according to the setting by the user, such as an image stored in the storage device 209 or an image of a page referenced by the information processing apparatus 101, instead of the scan image.

Second Embodiment

In the first embodiment, the method in which the instruction in the telephone function of the information processing apparatus 101 included in the destination of fax is converted into the instruction in the fax transmission function, and then the instruction is transmitted to the image forming apparatus 104 has been described. On the other hand, when the image forming apparatus 104 according to the present embodiment receives the job setting information including the instruction in the telephone function of the information processing apparatus 101 in the destination, the image forming apparatus 104 interprets the instruction as the instruction in the fax transmission function and performs fax transmission.

The information processing apparatus 101 and the image forming apparatus 104 according to the present embodiment basically have the same configuration as those described in FIGS. 1 to 7A and 7B in the first embodiment and have similar functions, and thus the overlapping description will be omitted. When the destination information included in the job setting information received from the information processing apparatus 101 includes the instruction in the telephone function, the image forming apparatus 104 according to the present embodiment interprets the instruction as the instruction in the fax transmission function of the image forming apparatus 104. The image forming apparatus 104 can convert, for example, the character string indicating the instruction in the telephone function included in the received job setting information into the character string indicating the instruction in the fax transmission function.

The information processing apparatus 101 according to the present embodiment transmits the destination of fax transmission to the image forming apparatus 104 without performing processing for converting the instruction in the telephone function into the instruction in the fax transmission function. In other words, the information processing apparatus 101 can transmit the instruction of fax transmission to the image forming apparatus 104 by performing the processing similar to that of FIG. 8A and FIG. 8B of the first embodiment, except for not performing the processing of S805 or S806.

Figure 10A:
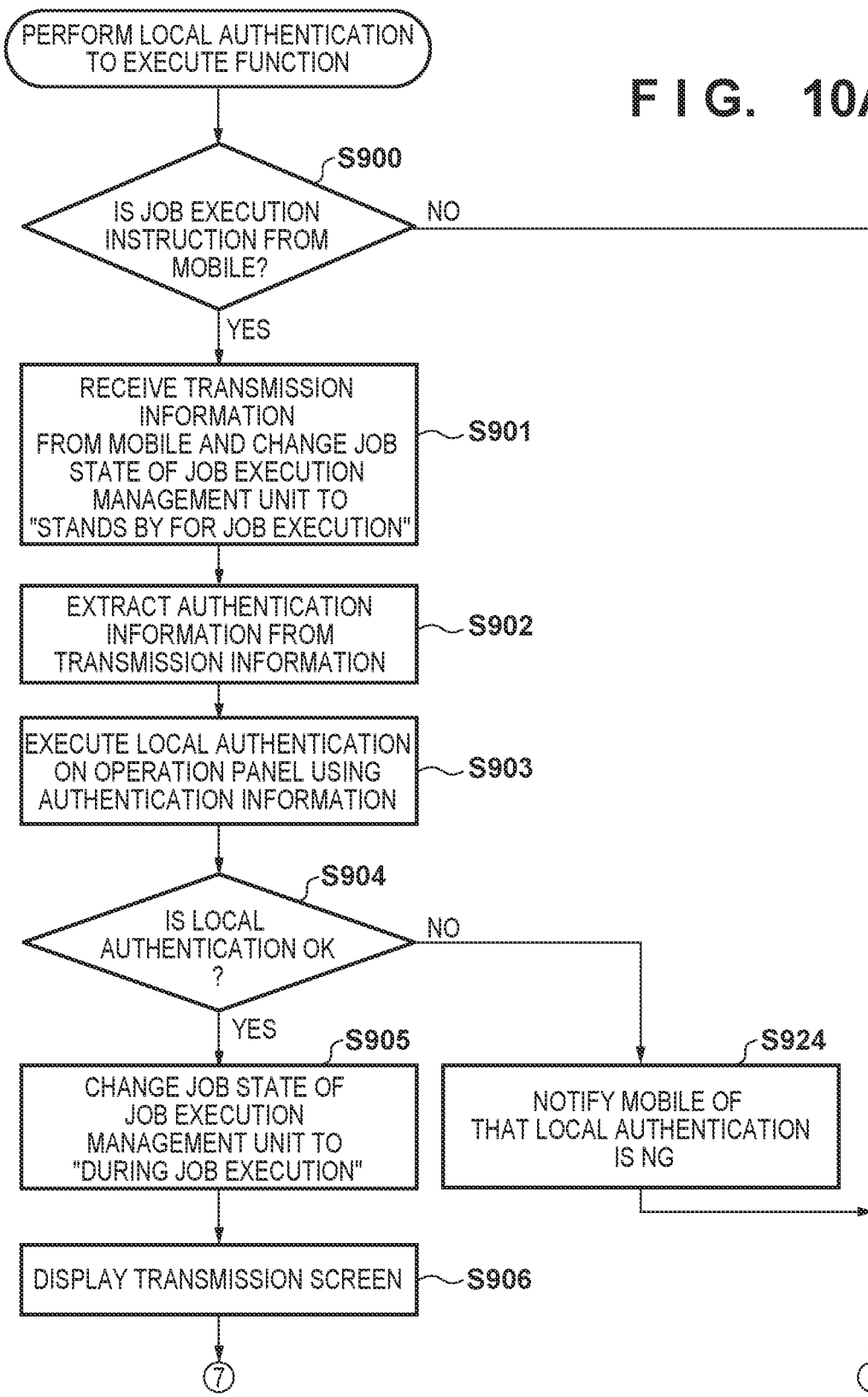
FIG. 10A, FIG. 10B and FIG. 10C are flowchart depicting an example of fax transmission processing according to a second embodiment.
Figure 10B:
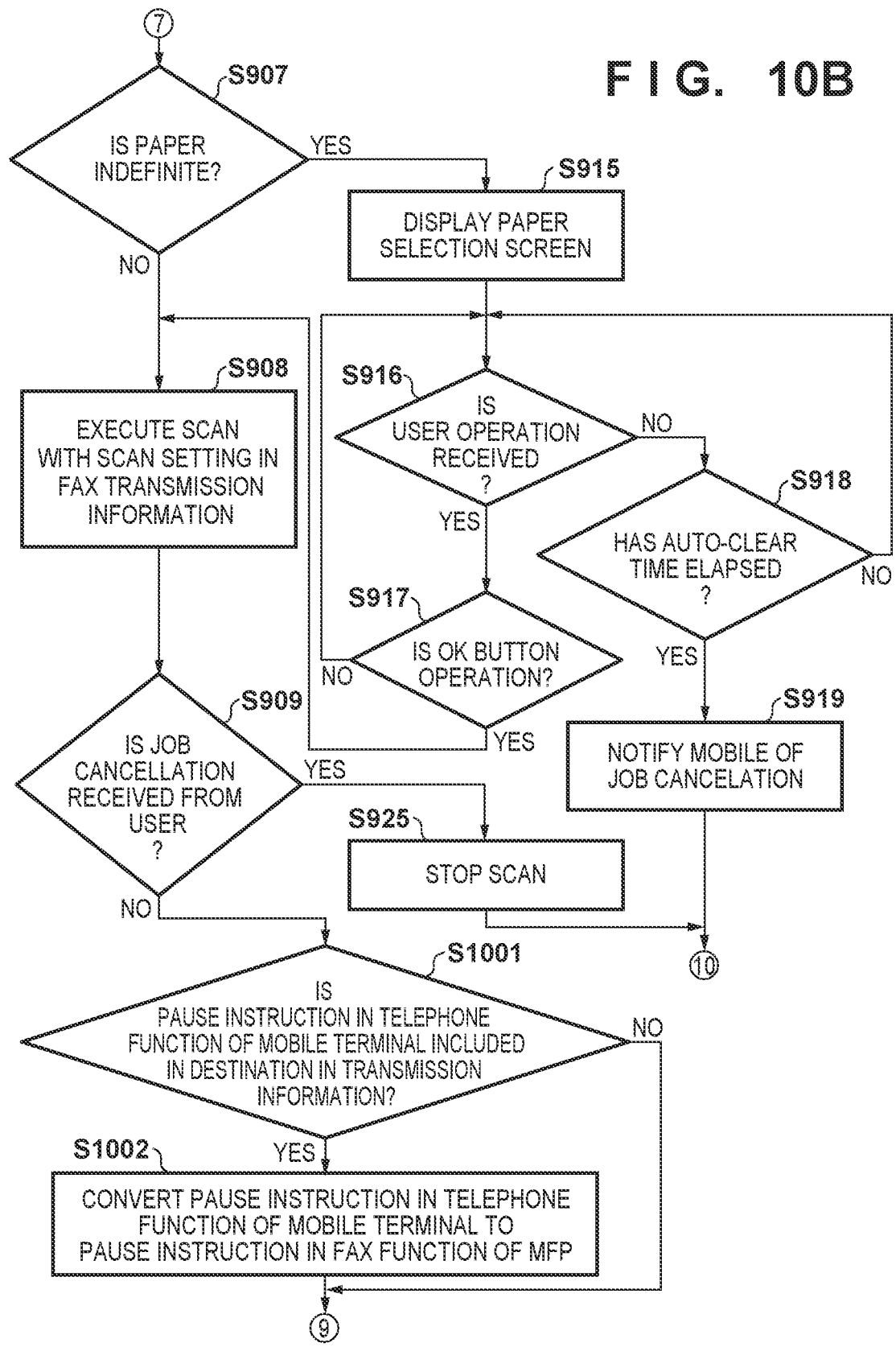
Figure 10C:
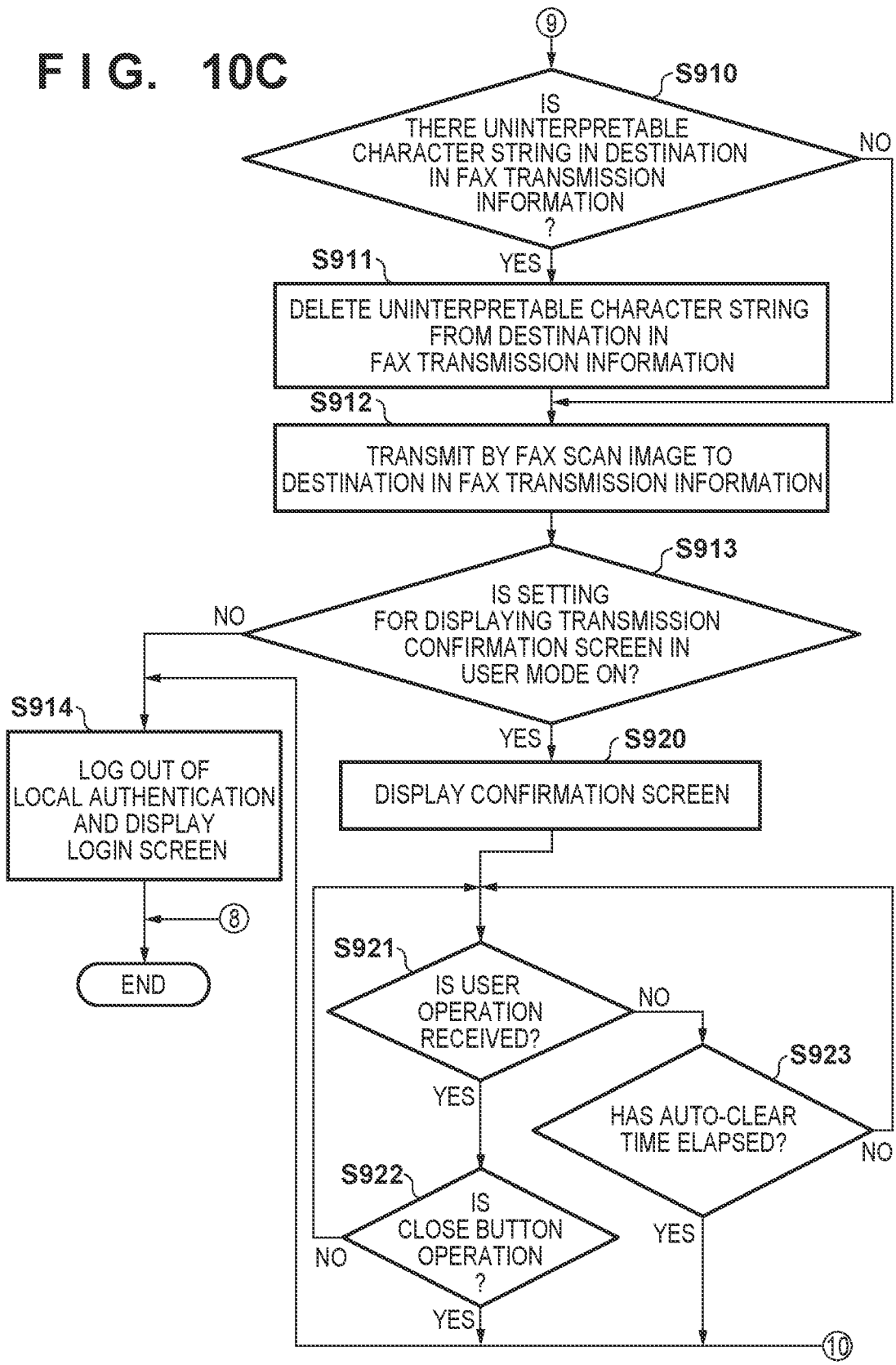

Next, with reference to FIG. 10A, FIG. 10B and FIG. 10C, the flow of the fax transmission processing of the image forming apparatus 104 will be described. Each operation depicted in the flowcharts of FIG. 10A, FIG. 10B and FIG. 10C is achieved by reading a program for achieving each control module stored in the ROM 304 or the HDD 305 on the RAM 303 and executing it by the CPU 302. The processing in FIG. 10A, FIG. 10B and FIG. 10C is performed similarly to that of FIG. 9A, FIG. 9B and FIG. 9C except that the processing S1001 and S1002 is performed between S909 and S910, and thus the overlapping description will be omitted.

In S1001 when the abort instruction of job has not been performed in S909, the CPU 302 determines whether the instruction in the telephone function of the information processing apparatus 101 is included in the destination included in the job setting information. When the instruction in the telephone function is included, the processing proceeds to S1002, and otherwise the processing proceeds to S910.

In S1002, the CPU 302 converts the instruction in the telephone function included in the destination into the instruction in the fax transmission function of the image forming apparatus 104, and advances the processing to S910. In this example, the CPU 302 converts "," indicating the pause instruction in the telephone function into "P" indicating the pause instruction in the fax transmission function.

Note that the image forming apparatus 104 may be configured to interpret the instruction in the telephone function as the instruction in the fax function in the processing of S910 and S911 without performing the conversion processing of S1001 and S1002. In this case, in S911 and S912, as shown in the table in FIG. 11B, the CPU 302 interprets the character string "," also as the instruction of the pause function in addition to the character string "P" and deletes an uninterpretable character string.

According to such processing, the image forming apparatus converts the instruction in the telephone function included in the destination of the received fax into the instruction in the fax transmission function, and thus can perform job execution. Accordingly, even when the user inputs the instruction in the telephone function to the destination of fax, it can be interpreted as the similar instruction also in the fax transmission function of the image forming apparatus, and fax can be transmitted to the destination intended by the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201992, filed Dec. 13, 2021, which is hereby incorporated by reference herein in its entirety.

What is claimed is:

1. A non-transitory computer-readable storage medium storing a program that, when executed by a computer, causes the computer to perform an information processing method, the information processing method comprises:
    setting destination information which indicates a destination of fax transmission;
    converting a first code into a second code indicating an instruction in a fax transmission function of an image forming apparatus when the destination information includes the first code;
    transmitting the destination information to the image forming apparatus, the destination information including the second code; and
    determining whether the destination information includes the first code indicating an instruction in a telephone function,
    wherein the converting converts the first code into the second code indicating the instruction in the fax transmission function of the image forming apparatus when the destination information is determined to include the first code.

2. The storage medium according to claim 1, wherein the destination information includes a telephone number and a first character string as the first code, and the converting converts the first character string in the destination information into a second character string as the second code.

3. The storage medium according to claim 2, wherein the destination information includes a number subsequent to the first character string.

4. The storage medium according to claim 1, wherein the first code is a code indicating an instruction of a pause function in a telephone function.

5. The storage medium according to claim 1, wherein the second code is a code indicating an instruction of a pause function in the fax transmission function.

6. The storage medium according to claim 1, wherein the destination information is information in a format input in a telephone function.

7. The storage medium according to claim 1, wherein the transmitting transmits an instruction of scanning an image to be transmitted by the fax transmission function to the image forming apparatus in addition to the destination information.

8. An information processing method comprises:
    setting destination information which indicates a destination of fax transmission;
    converting a first code into a second code indicating an instruction in a fax transmission function of an image forming apparatus when the destination information includes the first code;
    transmitting the destination information to the image forming apparatus, the destination information including the second code; and
    determining whether the destination information includes the first code indicating an instruction in a telephone function,
    wherein the converting converts the first code into the second code indicating the instruction in the fax transmission function of the image forming apparatus when the destination information is determined to include the first code.

9. The method according to claim 8, wherein the destination information includes a telephone number and a first character string as the first code, and the converting converts the first character string in the destination information into a second character string as the second code.

10. The method according to claim 9, wherein the destination information includes a number subsequent to the first character string.

11. The method according to claim 8, wherein
the first code is a code indicating an instruction of a pause function in a telephone function.

12. The method according to claim 8, wherein
the second code is a code indicating an instruction of a pause function in the fax transmission function.

13. The method according to claim 8, wherein
the destination information is information in a format input in a telephone function.

14. The method according to claim 8, wherein
the transmitting transmits an instruction of scanning an image to be transmitted by the fax transmission function to the image forming apparatus in addition to the destination information.

* * * * *